F. KOPEL.
TRAP.
APPLICATION FILED FEB. 28, 1919.
1,307,678.
Patented June 24, 1919.
2 SHEETS—SHEET 1.
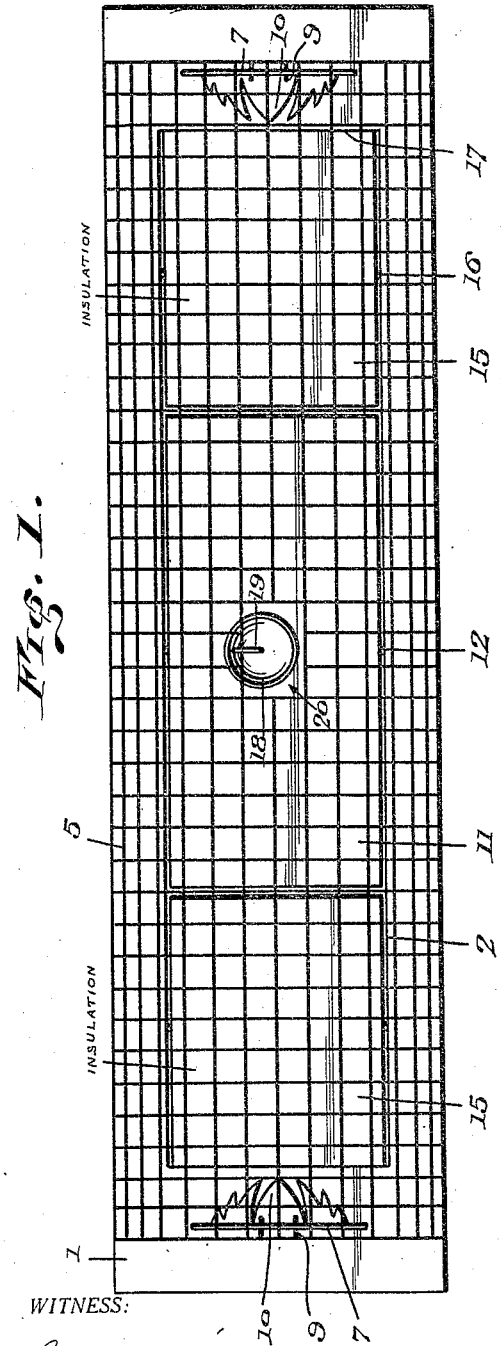
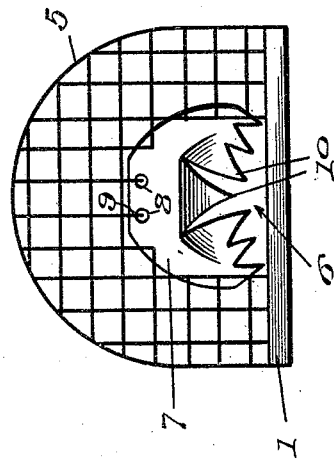
WITNESS:
INVENTOR.
Frank Kopel
BY
ATTORNEYS.

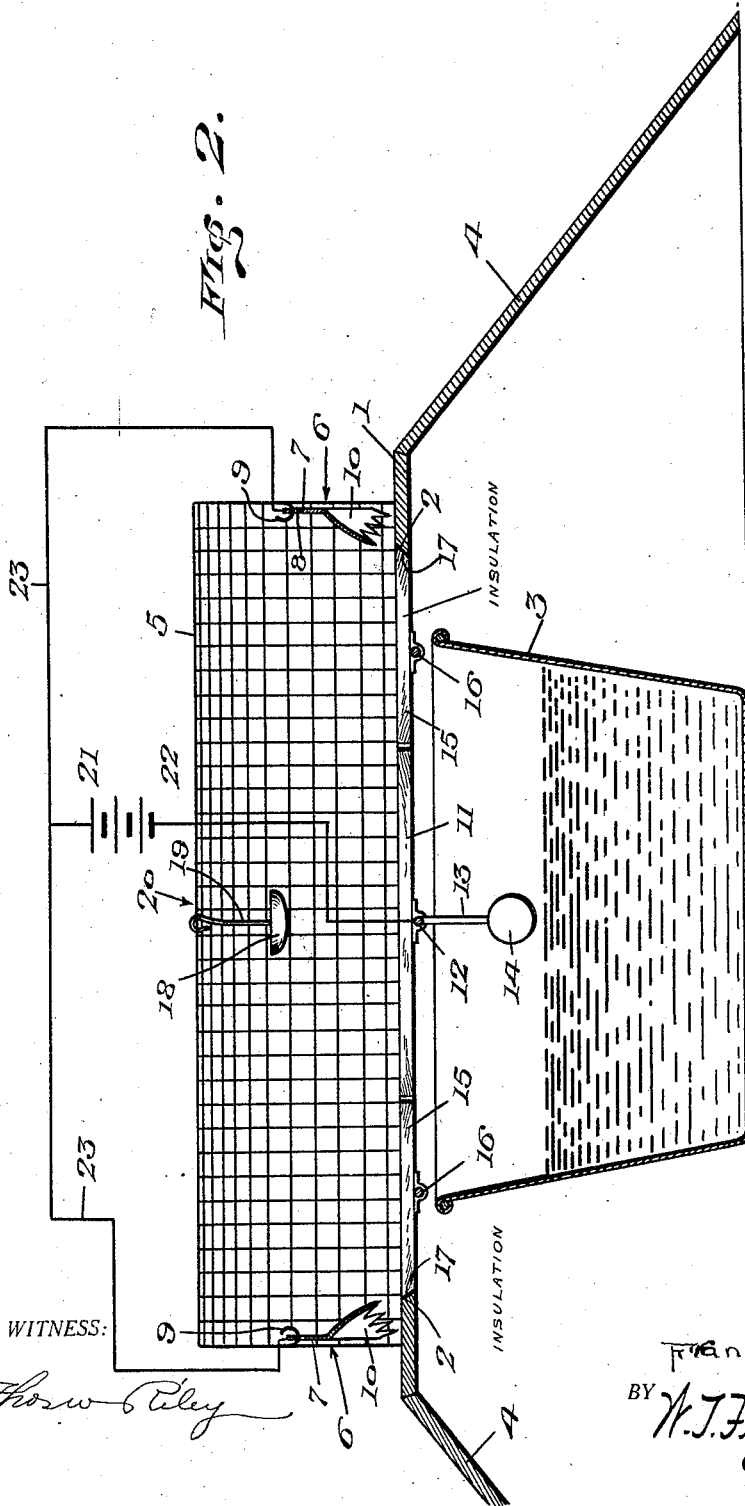

UNITED STATES PATENT OFFICE.

FRANK KOPEL, OF EXLINE, IOWA.

TRAP.

1,307,678.                    Specification of Letters Patent.     Patented June 24, 1919.

Application filed February 28, 1919. Serial No. 279,741.

*To all whom it may concern:*

Be it known that I, FRANK KOPEL, a citizen of the United States, residing at Exline, in the county of Appanoose and State of Iowa, have invented certain new and useful Improvements in Traps; and I do hereby declare the following to be a full, clear, and exact description of the invention, such as will enable others skilled in the art to which it appertains to make and use the same.

The present invention relates to traps, and more especially to traps for catching and exterminating rats and other rodents, it being the object of the invention to provide such a trap of novel and improved construction having means for electrocuting the rodents when they have entered the trap or cage thereof, and for dropping the rodents through the floor of the trap either into a vessel filled with water so as to drown the rodents if they are not electrocuted, or into any other receiver provided for that purpose.

A further object is the provision of novel means for preventing the rodents from escaping after they have once started to enter the trap, and to also render the operation of the trap more effective.

It is also the object of the invention to provide such a trap which will be cheap and inexpensive in construction, as well as effective in use.

With the foregoing and other objects in view which will be apparent as the description proceeds, the invention resides in the construction and arrangement of parts hereinafter described and claimed, it being understood that changes can be made within the scope of what is claimed without departing from the spirit of the invention.

The invention is illustrated in the accompaniyng drawings, wherein:—

Figure 1 is a plan view of the trap.

Fig. 2 is a longitudinal vertical section showing the runways, and also illustrating the electrical circuits in diagram.

Fig. 3 is an end view of the trap.

The trap includes an elongated base or floor 1 provided with an elongated opening 2 under which a suitable receiver is disposed for catching the rodents when they drop through said opening. This receiver may be a vessel 3 filled partly with water for drowning the rodents especially if they are not electrocuted, and if the floor or base of the trap is level with the ground, the vessel 3 may be disposed in a hole dug in the ground over which the trap is disposed. As shown, the trap is elevated above the vessel or receiver 3, and inclined runways 4 lead from the ground or floor of the room to the opposite ends of the base 1, in order that the rodents can readily enter the ends of the trap when attracted thereto by the bait.

A cage 5 of elongated form and preferably constructed of wire mesh, is mounted on the base 1 over the opening 2, and is provided at its ends with entrance openings 6 through which the rodents can pass into the cage.

In order to prevent the escape of the rodents after they have started through the openings 6, and to also make the trap more effective, depending flaps 7 of sheet metal or similar material are hung within the entrance openings. Thus, each flap 7 is provided adjacent to its upper edge with apertures 8 to engage hooks 9 with which the cage 5 is provided at the top of each opening 6. Said flaps are disposed at the inner sides of the ends of the cage, so as to swing inwardly and upwardly, and enable the rodents to readily enter. The lower central portion of each flap 7 is bulged or dished inwardly and serrated or toothed, as at 10, which not only enables the rodents to pass under the flaps easier, but which also makes the flaps conform to and fit the backs of the rodents as they pass under the flaps, so that an attempt of the rodent to back out will cause the teeth of the flap to prick into the back of the rodent, thus preventing the escape, it being noted that the teeth will lay on the back of the rodent at the moment that the rodent tends to back out, this will swing the flap backwardly or outwardly to bring the teeth into action. This also provides for the more effective electrical contact with the rodent between the flap 7 and rodent, said flap constituting one terminal of an electrical circuit. After the rodents have passed into the cage, the flaps 7 will swing back by gravity.

A main trap door 11 is mounted within the opening 2 between and spaced from the ends thereof, and is mounted on a transverse axle 12 extending under the opening. This axle 12 has a depending arm or pendulum 15 having a weight 14 which holds the door 11 horizontal, and permits it to tilt in either direction. This door 11 is of metal and constitutes the other terminal of the electrical circuit, as will hereinafter more fully appear. Between the ends of the door 11 and opening 2 are mounted supplementary or secondary trap doors 15, each mounted on a transverse axle 16 extending under the openings 2 near the respective ends thereof, and those wings of the doors 15 adjacent to the ends of the openings 2 are heavier than those wings adjacent to the door 11, so that the doors 15 will swing back to horizontal position after being tilted. The ends of the openings 2 and outer ends of the doors 15 are beveled or otherwise formed as at 17, so that said ends of the doors will rest on said ends of the opening to support said doors in position, and permit them to tilt inwardly toward the main trap door 11. The trap is thus double ended, so that a rodent can enter from either end, and in stepping between either door 15 and the central door 11, said doors will swing downwardly at their adjacent ends so that the rodent will drop downwardly therebetween into the receiver, when the doors will swing back into original position.

A bait holder 18 is suspended within the cage 5 above the door 11 by means of a hanger 19 having a hook at its upper end to engage the top of the cage, which is provided with an opening 20 through which the holder 18 may be inserted and removed, or through which bait can be inserted into the holder 18. The bait is to attract the rodent into the ends of the trap over the door 11.

In order to electrocute the rodents, a battery 21 or other suitable source of electrical energy is provided and of sufficient voltage to kill the rodent when it completes the circuit. One pole of the battery 21 is connected by a leader or conductor 22 with the door 11, which is of metal or other conducting material, while the doors 15 are of wood or other insulating material, and the other pole of the battery 21 is connected by leaders or conductors 23 with the flaps 7. Consequently, when the rodent enters either end of the trap and is passing under the flap 7, when the rodent steps on the door 11, it will complete the circuit between the flap 7 and door 11, thus electrocuting itself, and at the same moment, the trap doors will swing downwardly and deposit the rodent in the receiver.

The operation of the trap is entirely automatic, as the trap doors and electrocuting means are both reset after a rodent has entered and dropped into the receiver, so that it is not necessary for the operator to set the trap or otherwise give it attention, excepting to refurnish the bait and remove the rodents from time to time.

Having thus described the invention, what is claimed as new is:—

1. A trap embodying a cage having an entrance, a trap door below the cage constituting one terminal of an electrical circuit and having a portion extending toward said entrance and adapted to swing downwardly away from the entrance, a second trap door mounted between the first mentioned door and entrance and having a portion extending away from the entrance and swingable downwardly away from the first mentioned door, and a flap suspended at the entrance having a lower toothed edge to bear on a rodent passing through the entrance and constituting the other terminal of the electrical circuit.

2. A trap embodying a cage having an entrance, a trap door below the cage, constituting one terminal of an electrical circuit, a second trap door between the aforesaid door and entrance, said doors being mounted to swing downwardly and separate, and a flap suspended at said entrance to swing inwardly and bear on a rodent passing through the entrance and constituting the other terminal of the electrical circuit.

3. A trap embodying a base having an opening, a cage mounted on the base over said opening and having entrances at the opposite ends, a main trap door mounted within said opening to tilt in either direction, and constituting one terminal of an electrical circuit, secondary trap doors mounted between the aforesaid door and entrances and projecting toward the main door and swingable downwardly away from said main door, and flaps suspended from the cage at said entrances to swing inwardly and bear on rodents passing through said entrances and constituting the other terminal of the electrical circuit.

4. A trap embodying a cage having an entrance, a flap suspended loosely within said entrance to swing inwardly, the lower portion of said flap being dished inwardly and toothed to fit over and bear on the back of a rodent passing through said entrance, to prevent the rodent backing out, said flap constituting one terminal of an electrical circuit for electrocuting the rodent, and means onto which the rodent steps when passing under said flap and constituting the other terminal of the circuit.

In testimony whereof I have signed my name to this specification in the presence of two subscribing witnesses.

FRANK KOPEL.

Witnesses:
 EDWIN CAMPBELL,
 GEORGE HUTCHISON.